Patented Sept. 4, 1951

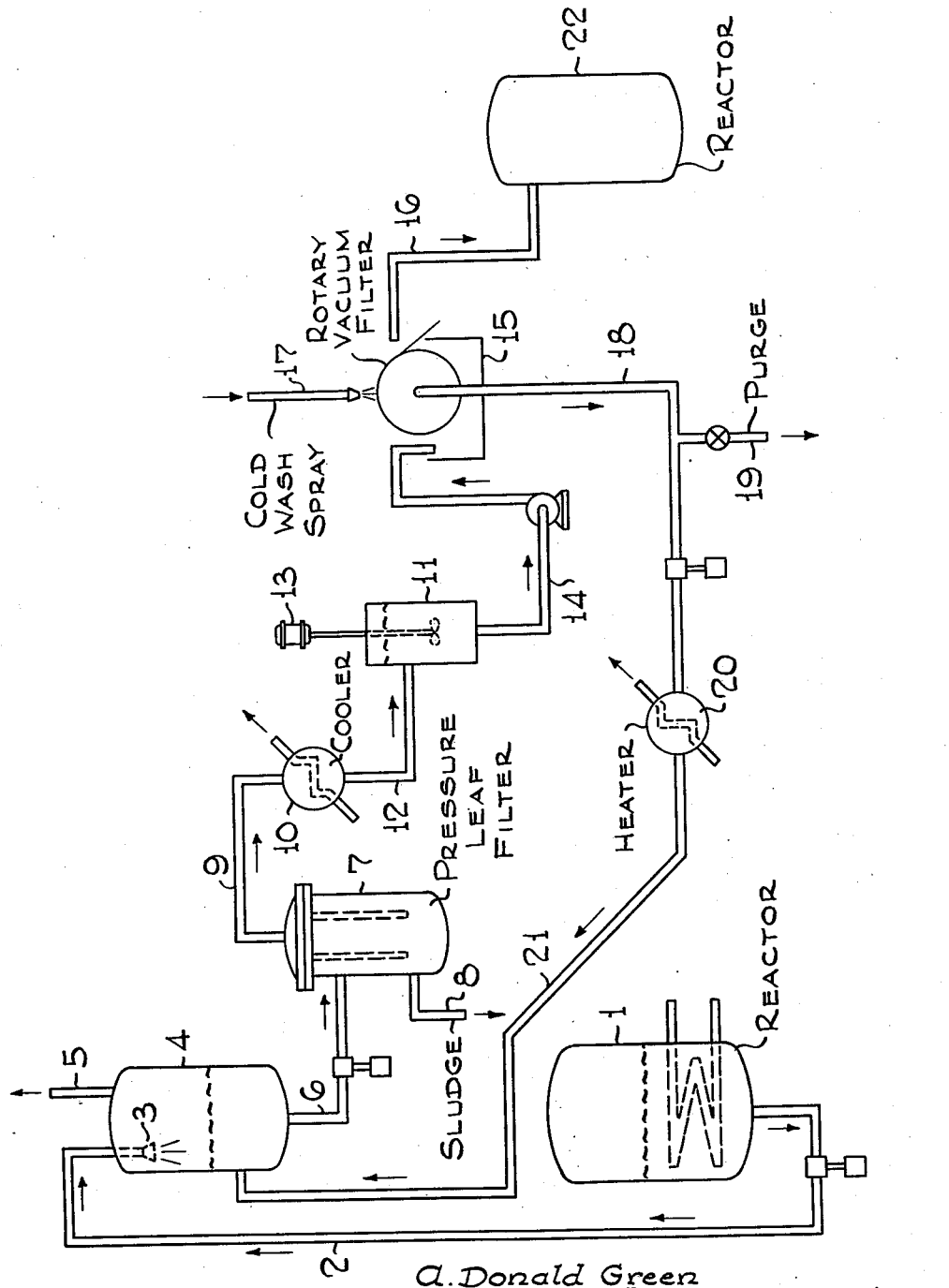

2,566,986

UNITED STATES PATENT OFFICE 2,566,986

PURIFICATION OF TETRAHYDROPHTHALIMIDES

Arthur D. Green, Ernest O. Ohsol, and Allen R. Kittleson, Cranford, N. J., assignors to Standard Oil Development Company, a corporation of Delaware Application September 20, 1949, Serial No. 116,664

9 Claims. (Cl. 260—326)

1

This invention relates to a process for the purification of tetrahydrophthalimides and more particularly to the purification of tetrahydrophthalimides for their use in the preparation of N-thiotrichloromethyl tetrahydrophthalimides.

N - thiotrichloromethyl (or N - trichloromethylthio) tetrahydrophthalimides are disclosed in U. S. application Serial No. 90,271, filed April 28, 1949, now Patent No. 2,553,770, as extremely effective parasiticides and especially effective fungicides.

These compounds are prepared by dissolving the desired imide, in an aqueous alkaline solution, followed by addition of about an equal molecular quantity of perchloromethyl mercaptan. The mixture is stirred rapidly, conveniently, until the aqueous medium becomes acid to litmus, then filtered to obtain the product which can be air dried. The reaction may be carried out at room temperature. In cases where the imide is readily hydrolyzed in alkaline solution, it may be advantageous to cool the reaction mixture as low as 0° C.

The metal compound used to supply the necessary alkaline solution is a compound of an alkali metal, such as lithium, sodium and potassium, and the like. Because of cost factors, sodium and potassium are preferred. The alkali is present preferably in amounts equivalent to the imide used. While other basic compounds may be used, it is desirable to use the alkali hydroxides because of the consequent avoidance of the presence of other anion radicals which might have to be removed.

Variations on these procedures can be made, of course. Thus the alkali metal imide salts, if available, can be dissolved directly in water and the process further carried on as indicated above for the aqueous solution reaction.

N-thiotrichloromethyl tetrahydrophthalimide, which is illustrated by Formula I below

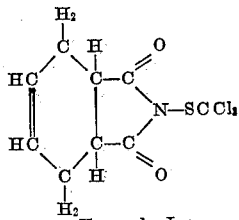

Formula I employs tetrahydrophthalimide as the starting material.

In the manufacture of tetrahydrophthalimide, the final step usually comprises heating a melt of tetrahydrophthalimide to a temperature in the range of 204° to 260° C. to convert amides or ammonium salts to the imide. In conventional methods of subsequent isolation of the desired tetrahydrophthalimide product, the melt is cooled, solidified, broken up, ground to a powder, and purified by recrystallization from a solvent such as acetone or alcohol. The hot melt is also sometimes distilled under high vacuum to take overhead a pure imide cut either as a molten distillate or as a solid sublimate. In each case, there still remains a rather expensive and cumbersome step of cooling hot melt or solids, crushing and grinding.

In addition, it has been found that crude tetrahydrophthalimide contains as an impurity an ingredient which actually poisons and inhibits the subsequent reaction of the imide with perchloromethyl mercaptan.

The present invention is an improved method for the purification of tetrahydrophthalimides which is ideally adapted to overcome the beforementioned difficulties. The method comprises injecting crude hot molten tetrahydrophthalimide into an aqueous medium, e. g., water or an aqueous tetrahydrophthalimide hydrolysis product solution, which is thereby maintained at a temperature near its boiling point so as to dissolve the tetrahydrophthalimide, removing undissolved solids, crystallizing the purified tetrahydrophthalimide from the aqueous medium, preferably utilizing the resultant aqueous mother liquor for the further purification of crude tetrahydrophthalimide, and if it is desired to make the N-thiotrichloromethyl tetrahydrophthalimide, utilizing the thus purified tetrahydrophthalimide in the manufacture of the N-thiotrichloromethyl tetrahydrophthalimide.

The crude tetrahydrophthalimide may be prepared by a number of means. One of the better ways is by reaction between maleic anhydride and butadiene. The butadiene vapors are passed countercurrently upwardly through downflowing molten maleic anhydride, yielding tetrahydrophthalic anhydride. The latter in the molten state is then passed downwardly countercurently to upwardly rising ammonia vapors. The product is then heated to maintain the residue in the molten state and to drive off ammonia and water so as to yield the desired tetrahydrophthalimides. The molten tetrahydrophthalimide thus obtained by whichever process is utilized for its preparation and has a melting point of 135° to 136° C.

There are several possible variations in the preparation of tetrahydrophthalimides. Thus maleic anhydride can be dissolved in a solvent such as benzene and the butadiene bubbled into it. This is done in a stirred reactor with a cooling jacket and the use of excess butadiene. The tetrahydrophthalic anhydride is isolated and dissolved in ammonium hydroxide to form the ammonium salt of the acid amide which after driving off the excess water and heating, yields the imide.

This invention will be better understood by reference to the flow diagram shown in the drawing. The hot melt of crude tetrahydrophthalimide is withdrawn from tetrahydrophthalimide reactor 1 through line 2 to quench-vessel or mixing zone 4 containing water which has been heated to below its boiling point. The hot tetrahydrophthalimide melt is preferably sprayed as a finely-divided stream through nozzle 3 and raises the temperature of the water in quench zone 4 to near its boiling point. Any steam formed goes overhead through line 5. The amount of water employed in quench zone 4 and its initial temperature are chosen so as to minimize steam formation. A slight pressure in quench zone 4 also prevents excessive steam formation at temperatures slightly above the boiling point of water.

The aqueous mixture withdrawn through line 6 to pressure leaf filter 7 consists of an aqueous solution of tetrahydrophthalimide, water-soluble impurities, and water-insoluble impurities, and is maintained at approximately the same temperature as in quench zone 4. The water-insoluble impurities are removed from the aqueous mixture in pressure leaf filter 7 as sludge through line 8. The residual aqueous filtrate is withdrawn from pressure leaf filter 7 through line 9 to cooler 10 where it is cooled and circulated rapidly and then withdrawn to holding drum 11 through line 12. Holding drum 11 is agitated by stirrer 13.

The aqueous filtrate is cooled to approximately atmospheric temperature, e. g., 15° to 35° C., at which point the tetrahydrophthalimide precipitates out, while the water-soluble impurities remain in solution. The slurry of tetrahydrophthalimide and water is withdrawn through line 14 to rotary vacuum filter 15 where the precipitate is filtered from the mother liquor. The tetrahydrophthalimide withdrawn through line 16 is sufficiently pure for most purposes. Where the N-thiotrichloromethyl tetrahydrophthalimide is to be prepared, the tetrahydrophthalimide crystals can be sent directly to perchloromethyl mercaptan reactor 22. In the latter the crystals are dissolved in an alkali hydroxide solution and reacted with perchloromethyl mercaptan as discussed above.

If desired, the crystallized tetrahydrophthalimide containing some water-soluble impurities can be further washed with cool water at atmospheric temperature to further purify the crystallized product. The water-wash liquid enters rotary filter 15 through line 17. The combined wash liquid and mother liquor withdrawn through line 18 contains some tetrahydrophthalimide and a major proportion of the water-soluble impurities. Part of this stream is purged through line 19 to prevent undesirable buildup. Line 17 is thus also used as the entry point for fresh water for the system. The recirculated combined aqueous media are heated to a suitable temperature below the boiling point in heater 20 as discussed below, and returned through line 21 to quench zone 4.

The temperature of the water in the quench zone is high enough, i. e., near its boiling point, so as to completely dissolve the tetrahydrophthalimide and yet low enough so as not to be unduly vaporized and result in excessive hydrolysis of the tetrahydrophthalimide. The temperature of the water in quench zone 4 is thus in the range of 65°–107° C., and preferably in the range of 80°–104° C. The use of pressure in quench zone 4 permits of higher temperatures but at the cost of tetrahydrophthalimide hydrolysis.

The temperature of the water in quench zone 4 is attained by the utilization of the heat of the incoming molten tetrahydrophthalimide. The incoming water is heated, if necessary, in heater 20 only sufficiently to bring it up to the desired level utilizing the heat of the molten tetrahydrophthalimide as the major source of heat. At the preferred temperature range indicated, two pounds of water per pound of imide contained in the crude product is approximately sufficient to remove all the soluble materials usually present from the crude imide. In general, one to three pounds of water at this temperature range is necessary for the complete solubility of the tetrahydrophthalimide purified by this process.

The amount of aqueous solution purged through line 19 is adjusted so as to maintain the concentration of water-soluble products contained therein substantially below their saturation point, i. e., 10 wt. per cent or less. This latter object is attained by the indicated purging as well as the addition of fresh water in line 17.

The variation of tetrahydrophthalimide solubility with temperature can be seen from the fact that at 88° C., a 31.4 wt. per cent solution of tetrahydrophthalimide in water is obtained, while at 26° C. only about a 1.7 wt. per cent solution is obtained. Hence, the solution needs to be cooled to approximately only room temperature to precipitate out the major proportion of dissolved tetrahydrophthalimide.

The water-insoluble impurities removed from the crude imide are highly complex and apparently polymeric in nature. It is predominantly this material which apparently causes the poisoning of the N-thiotrichloromethyl tetrahydrophthliamide reaction discussed above.

The water-soluble impurities remaining in the mother liquor after crystallization of the tetrahydrophthalimide at atmospheric temperature are tetrahydrophthalic acids, amides, acid amides, and similar compounds. These can be recovered, if desired, along with dissolved tetrahydrophthalimide by evaporation of the filtrate removed through line 19. These materials can be considered broadly as "tetrahydrophthalimide hydrolysis products." Thus while the crude tetrahydrophthalimide melt is dissolved initially in water, subsequent batches of the imide are conveniently dissolved in unsaturated solutions of the hydrolysis products. If these unsaturated solutions are available to begin with, the crude tetrahydrophthalimide may be dissolved initially in these solutions.

The purified tetrahydrophthalimide obtained by the process of this invention exhibits none of the poisoning activity discussed above and therefore reacts readily with perchloromethyl mercaptan by the methods listed to obtain high yields of N-thiotrichloromethyl tetrahydrophthalimide.

The improved method of this invention is illustrated in the following examples.

EXAMPLE I

A hot melt of crude tetrahydrophthalimide of 94.5% purity at a temperature of about 232° C. and comprising about 100 pounds tetrahydrophthalimide, 5 pounds of soluble impurities, and 1 pound insoluble impurity, is pumped in a fine stream into a vessel simultaneously fed with an aqueous solution containing about 200 pounds of water, about 4 pounds of dissolved tetrahydrophthalimide, and about 11 pounds of soluble hydrolysis products. The entering water is at a temperature of approximately 60° C. and its temperature is raised by the incoming tetrahydrophthalimide melt to about 93° C. The tetrahydrophthalimide and soluble impurities dissolve in the hot solution, and the insoluble impurities are removed by hot filtration at approximately 93° C.

The solution is then cooled rapidly to atmospheric temperature, e. g., 29° C., at which point most of the tetrahydrophthalimide crystallizes out. The crystallized tetrahydrophthalimide is then washed with 100 pounds of cool water at atmospheric temperature. The combined mother liquor solution from the tetrahydrophthalimide crystallization and wash liquid is then purged to remove a solution containing 80 pounds of water, 4.5 pounds of soluble impurities, and 1.7 pounds of tetrahydrophthalimide. The residual 200 pounds of water, which is at 29° C. and contains dissolved at equilibrium 11 pounds of soluble impurities and 4.3 pounds of tetrahydrophthalimide, is heated to 60° C. This heated solution is then recycled to remove additional impurities from further quantities of crude tetrahydrophthalimide. The entering hot melt of crude tetrahydrophthalimide raises the temperature of this aqueous solution to about 93° C., which is within the desired range.

The tetrahydrophthalimide product obtained from the crystallization and water-washing consists of 98 pounds of pure tetrahydrophthalimide, 20 pounds of water, and ½ pound of soluble impurity. This product can be dehydrated if desired and is over 99% pure.

EXAMPLE II

A crude tetrahydrophthalimide was employed in the manufacture of N-thiotrichloromethyl tetrahydrophthalimides. The tetrahydrophthalimide was dissolved in sodium hydroxide and reacted with admixed perchloromethyl mercaptan. A yield of 70% was obtained.

EXAMPLE III

Another batch of the crude tetrahydrophthalimide from the same source as in Example II was purified according to the process of this invention and then reacted to form N-thiotrichloromethyl tetrahydrophthalimide in the same manner as in Example II. A yield of 91.5% was obtained, or an increase of over 30% over the yield of Example II.

This illustrates the great improvement in yield resulting from the purification process of this invention.

EXAMPLE IV

A batch of purified tetrahydrophthalimide purified in the same manner as in Examples I and III above, was reacted in exactly the same manner as in Example III to form N-thiotrichloromethyl tetrahydrophthalimides except that 1 to 2 wt. per cent (based on tetrahydrophthalimide used) of the water-insoluble impurities, obtained by the first filtration after the tetrahydrophthalimide solution in hot water, were added to the reaction mixture. The yield of N-thiotrichloromethyl tetrahydrophthalimide was decreased up to 20%, compared to the yield of Example III. This indicates that the decrease in yield of N-thiotrichloromethyl tetrahydrophthalimide with crude tetrahydrophthalimide is due to a positive poisoning effect rather than the mere decrease in concentration of the active reactant.

The process of this invention is applicable to the purification of other tetrahydrophthalimides such as endomethylene tetrahydrophthalimide, and other products obtained from condensation of a diene and maleic anhydride followed by condensation with ammonia (or example, the imide of the adduct of isoprene with maleic anhydride).

It is apparent that the indicated separations obtained by filtration can also be accomplished by a wide variety of other filtering, settling and decanting means.

It is to be understood that the invention is not limited to the specific examples which have been offered merely as illustrations and that modifications may be made without departing from the spirit of this invention.

What is claimed is:

1. A process for the purification of tetrahydrophthalimides which comprises the steps of injecting crude molten tetrahydrophthalimide into water in a quench zone, the initial temperature of the water being such that the higher temperature to which the water is raised by heat transfer from the molten tetrahydrophthalimide is high enough to effect solution of substantially all the tetrahydrophthalimide but low enough so that the major proportion of the water is maintained in the liquid phase; filtering the resulting aqueous solution maintained at approximately the same temperature as in the preceding step so as to remove water-insoluble impurities therefrom and cooling the residual aqueous filtrate to approximately 15 to 35° C. to crystallize the tetrahydrophthalimide out of solution.

2. A process as in claim 1, including the additional step of washing the crystallized tetrahydrophthalimide with water at approximately 15 to 35° C.

3. A process as in claim 2, including the additional step of combining the resultant mother liquor from the tetrahydrophthalimide crystallization step with the aqueous wash liquid from the tetrahydrophthalimide washing step and recycling the combined aqueous media to the quench zone for the further purification of crude tetrahydrophthalimide.

4. A process as in claim 1 in which the higher temperature of the water after heating by the crude tetrahydrophthalimide in the quenching zone is in the range of 80°–104° C. and the amount of water in the quenching zone is in the range of about 1 to 3 pounds of water to 1 pound of tetrahydrophthalimide in the crude tertahydrophthalimide.

5. A process for the purification of tetrahydrophthalimides which comprises the steps of supplying to a mixing zone a stream of crude, molten tetrahydrophthalimide at a temperature in the range of 204°–260° C.; supplying to said mixing zone a stream of water at a temperature of below 65° C., said water being in an amount and under such pressure that its temperature is raised to a temperature in the range of 65°–107°

C. by direct heat transfer from the molten tetrahydrophthalimide while being maintained predominantly in the liquid phase; withdrawing the resulting tetrahydrophthalimide solution and separating water-insoluble impurities therefrom at a temperature approximately the same as in the mixing zone and cooling the thus separated solution to 15 to 35° C. to crystallize the tetrahydrophthalimide out of solution.

6. A process as in claim 5 in which the temperature of the water initially supplied to the mixing zone is below 80° C. and its temperature after being heated by the molten tetrahydrophthalimide is in the range of 80°–104° C.

7. A process as in claim 6, including the additional step of washing the crystallized tetrahydrophthalimide with water at approximately 15 to 35° C.

8. A process as in claim 7, including the additional step of combining the resultant mother liquor from the tetrahydrophthalimide crystallization step with the aqueous wash liquid from the tetrahydrophthalimide washing step and recycling the combined aqueous media to the mixing zone for the further purification of crude tetrahydrophthalimide.

9. A process for the purification of tetrahydrophthalimides which comprises the steps of supplying to a mixing zone a stream of crude, molten tetrahydrophthalimide at a temperature in the range of 204°–260° C.; supplying to said mixing zone an aqueous stream consisting of an unsaturated solution of tetrahydrophthalimide hydrolysis products at a temperature of below 80° C., said aqueous stream being in an amount of and under such pressure that its temperature is raised to a temperature in the range of 80°–104° C. by direct heat transfer from the molten tetrahydrophthalimide while being maintained predominantly in the liquid phase; withdrawing the resultant tetrahydrophthalimide solution from the mixing zone and filtering insoluble impurities therefrom at a temperature approximately the same as in the mixing zone; cooling the residual aqueous filtrate to 15 to 35° C. to crystallize the tetrahydrophthalimide out of solution; washing the crystallized tetrahydrophthalimide with water at 15 to 35° C.; combining the resultant mother liquor from the tetrahydrophthalimide crystallization step with the aqueous wash liquid from the tetrahydrophthalimide washing step; purging these combined aqueous media so as to maintain the concentration of soluble products contained therein substantially below their saturation point and recycling the purged, residual aqueous media to the mixing zone for further purification of crude tetrahydrophthalimide.

ARTHUR D. GREEN.
ERNEST O. OHSOL.
ALLEN R. KITTLESON.

REFERENCES CITED

The following references are of record in the file of this patent:

UNITED STATES PATENTS

| Number | Name | Date |
|---|---|---|
| 1,914,723 | Jaeger | June 20, 1933 |